(12) United States Patent
Au Yeung

(10) Patent No.: US 6,169,559 B1
(45) Date of Patent: Jan. 2, 2001

(54) HI-LITE COLOR ROS SCAN UNIFORMITY SELF CORRECTION ARCHITECTURE

(75) Inventor: Vincent W. M. Au Yeung, Temple City, CA (US)

(73) Assignee: Xerox Corporation, Stamford, CT (US)

( * ) Notice: Under 35 U.S.C. 154(b), the term of this patent shall be extended for 0 days.

(21) Appl. No.: 07/977,963

(22) Filed: Nov. 18, 1992

(51) Int. Cl.⁷ .................................................. G03G 15/04
(52) U.S. Cl. .............................. 347/119; 347/246; 358/1.7
(58) Field of Search .................................. 347/115, 119, 347/132, 133, 232, 236, 246; 358/1.7; 430/42; 399/40

(56) References Cited

U.S. PATENT DOCUMENTS 4,990,955 * 2/1991 May et al. .............................. 399/40
5,126,761 * 6/1992 Asada .................................... 347/236
5,260,799 * 11/1993 Loce et al. ........................ 347/119 X

* cited by examiner

*Primary Examiner*—Joan Pendegrass
(74) *Attorney, Agent, or Firm*—Fariba Rad

(57) ABSTRACT

A highlight raster output scanner is disclosed which utilizes an amplitude modulation with its reference level being placed at its white level. Having the reference level at the white level provides the possibility of utilizing two independent power drivers to generate modulation pulses. One power driver generates color pulses (above the white level) and the second power driver generates black pulses (bellow the white level). Since an independent power driver is generating the color pulses, the color level can be raised to saturation to prevent the nonuniformity of the intensity of the light beam for color. Also, any intensity variation of the white level can be adjusted by comparing the white level against the reference level. Finally, the black level is kept at ground potential in the same manner as the prior art.

2 Claims, 2 Drawing Sheets

HI-LITE COLOR ROS SCAN UNIFORMITY SELF CORRECTION ARCHITECTURE

DESCRIPTION OF THE PREFERRED EMBODIMENT

This invention relates to a scan uniformity correction for a highlight Color raster output scanner.

It is an object of this invention to place the reference level of the pulses generated by amplitude modulation at the white level for the purpose of distinguishing the color pulses from the black pulses.

It is also, an object of this invention to use two independent power drivers to generate color pulses and black pulses.

It is further an object of this invention to correct the non-uniformity of the intensity of the light beam for the color level and for the white level independent of each other by raising the level of the color pulses and also by comparing the white level to a fixed reference level.

Other objects will become apparent from the following description with reference to the drawings wherein.

A conventional raster output scanner utilizes either a light source, a modulator and a multi-faceted rotating polygon mirror as the scanning element or a light source, which serves as both a light source and a modulator, along with a multi-faceted rotating polygon mirror. In a raster output scanner with a light source and a separate modulator, the light source, which can be a laser source, generates a light beam and sends it to the modulator. The modulator receives pixel information and modulates the pixel information onto the light beam. However, in the raster output scanner without a separate modulator, the light source, which can be a laser diode, both generates and modulates the light beam. Then, the modulated light beam is directed onto a facet of a rotating polygon mirror. The rotating polygon mirror reflects the light beam and also causes the reflected light to revolve about an axis near the center of rotation of the rotating polygon and scan a straight line. This reflected light beam can be utilized to scan a document at the input of an imaging system or can be used to impinge upon a photographic film or a photosensitive medium, such as a xerographic drum at the output of the imaging system.

Figure 1:
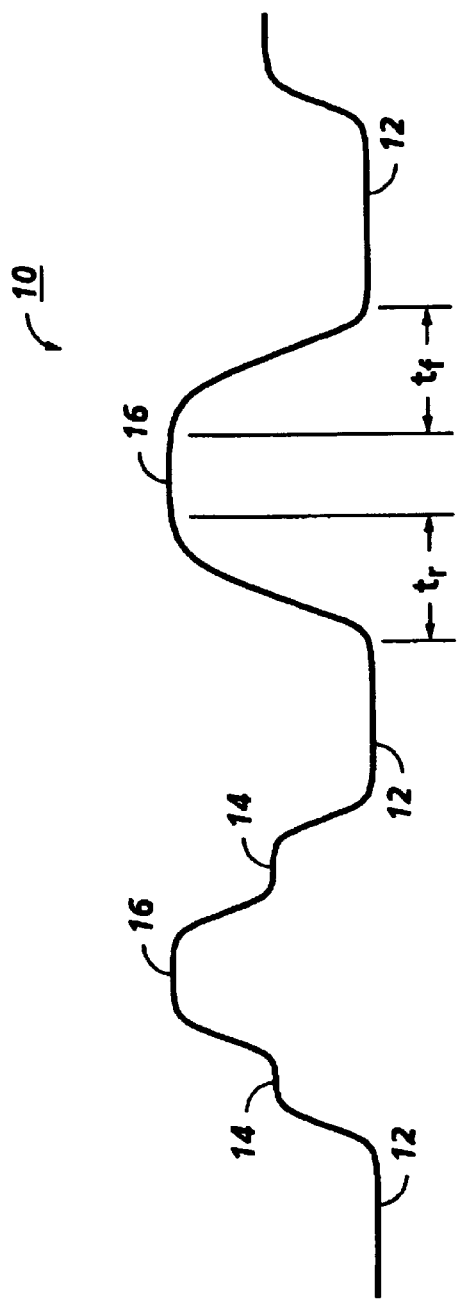
FIG. 1 is a curve showing the pulses generated by a prior art amplitude modulator while the reference level is at the black level.

Referring to FIG. 1, a curve 10 of an amplitude modulation for a highlight color is shown. In highlight color, the amplitude modulation is based on three levels. Level 12 (black level), which is the lowest level and usually is kept at 0 volts (ground level), represents black ink. Level 14 (white level) represents white. White is a term used for no printing since when there is no printing the color of the paper which usually is white will be shown. Of course, if a different color paper is used, white represents the color of the paper. Finally level 16 (color level) represents a second ink which can have any color other than black and the color of paper. Typically, in amplitude modulation, the black level 12 is the reference level. Therefore every time the printing starts, the power driver should charge up to the white level since the white level is the first color in printing.

The first problem in both amplitude modulation and pulse width modulation, which is another conventional way of modulating a light beam in a highlight color system, is to switch a large amount of current in a relatively short time i.e. less than 1 nsec. This results in an over shoot or a slow rise time and fall time. Typically, the rise time $t_r$ from the black level 12 to the color level 16 and the fall time $t_f$ from the color level 16 to the black level 12 are between 2 nsec to 5 nsec. In a high speed highlight color system, a substantial amount of over shoot or a slow rise time or fall time is not acceptable. Moreover, the rise time $t_r$ and the fall time $t_f$ can not be improved due to the limitations of the power drivers used in the modulators.

Furthermore, many of the conventional raster output scanners exhibit a modulated light beam which has a varying intensity over one scan line. For instance, the modulated light beam at the start of the scan line and at the end of the scan line has less intensity than at the center of the scan line. If the intensity variation (difference between the highest intensity and the lowest intensity) becomes more than a certain limit, it can be observed on the printed document as lighter prints at the edges of the document and as darker prints at the center of the document. In highlight color systems, each level has a different intensity variation. In other words, the intensity variation of color is different than the intensity variation of white. Since the white level is for no printing, any variation of the intensity for the white level moves the no printing into printing either gray or a pale color. If the intensity variation is above the white level or below the white level, then a pale color or gray will be printed on the document respectively.

The second problem in the modulators of the highlight color systems is that correcting the non-uniformity of the intensity of the light beam in one level does not correct the non-uniformity of the light at a different level. Usually, since there is only one power driver which generates the pulses, only the intensity variation of the light at one level can be corrected. Typically, the intensity variation is corrected by measuring the intensity variation of the light beam and feeding it back to the power driver which automatically adjusts the intensity of the light beam for that level. However, since each level has a different intensity variation the amount of adjustment for one level does not match the amount of variation of a different level. This is due to the characteristics of the laser diodes. Therefore, the intensity adjustment for one level does not correct the intensity variation of a different level.

Finally, the third problem is an inherent problem of the pulse width modulation in a highlight color system which uses a light source with an external modulator. Pulse width modulation has a high frequency which causes a problem known as "beating" with the frequency used for facet tracking. Facet tracking is a system used to keep the beam at the center of the facet while the facet is rotating. Beating is a phenomenon happening between two close frequencies. Beating occurs since the frequency used for facet tracking is close to the frequency generated by the pulse width modulation. When beating happens at some points the amplitudes of the two waves add up to each other and at some points the amplitudes cancel each other. A beating problem on a printed document can be observed as periodic dark and light stripes.

It may seem that by using a scanning system without a facet tracking, the problem of beating can be eliminated. However, in a high speed highlight color system, facet tracking is a feasible approach verses a large high speed polygon motor. Therefore, for a high speed highlight color system, a small polygon is a must which in turn requires a facet tracking system and consequently, a facet tracking system requires a high speed modulator with pulse width modulation.

Figure 2:
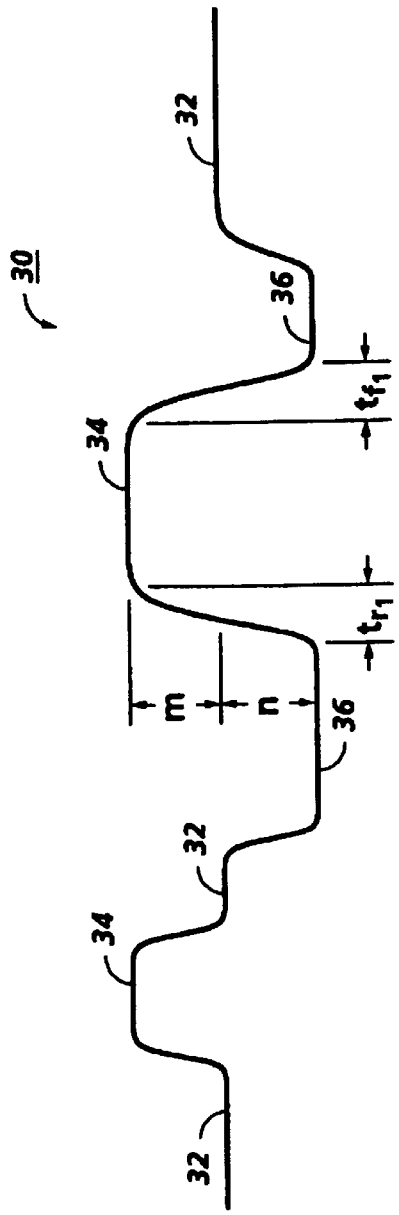
FIG. 2 is a curve showing the pulses generated by the amplitude modulator of the sent invention while the reference level is at the white level.

Referring to FIG. 2, a curve 30 of an amplitude modulation of this invention used for a highlight color is shown. In this invention, the reference level of the amplitude modulation is placed at the white level 32. Color level 34 and black level 36 are generated in reference to the white level 32. Also, this invention utilizes two independent power drivers: one for the pulses above the reference level 32 and one for the pulses bellow the reference level 32.

Figure 3:
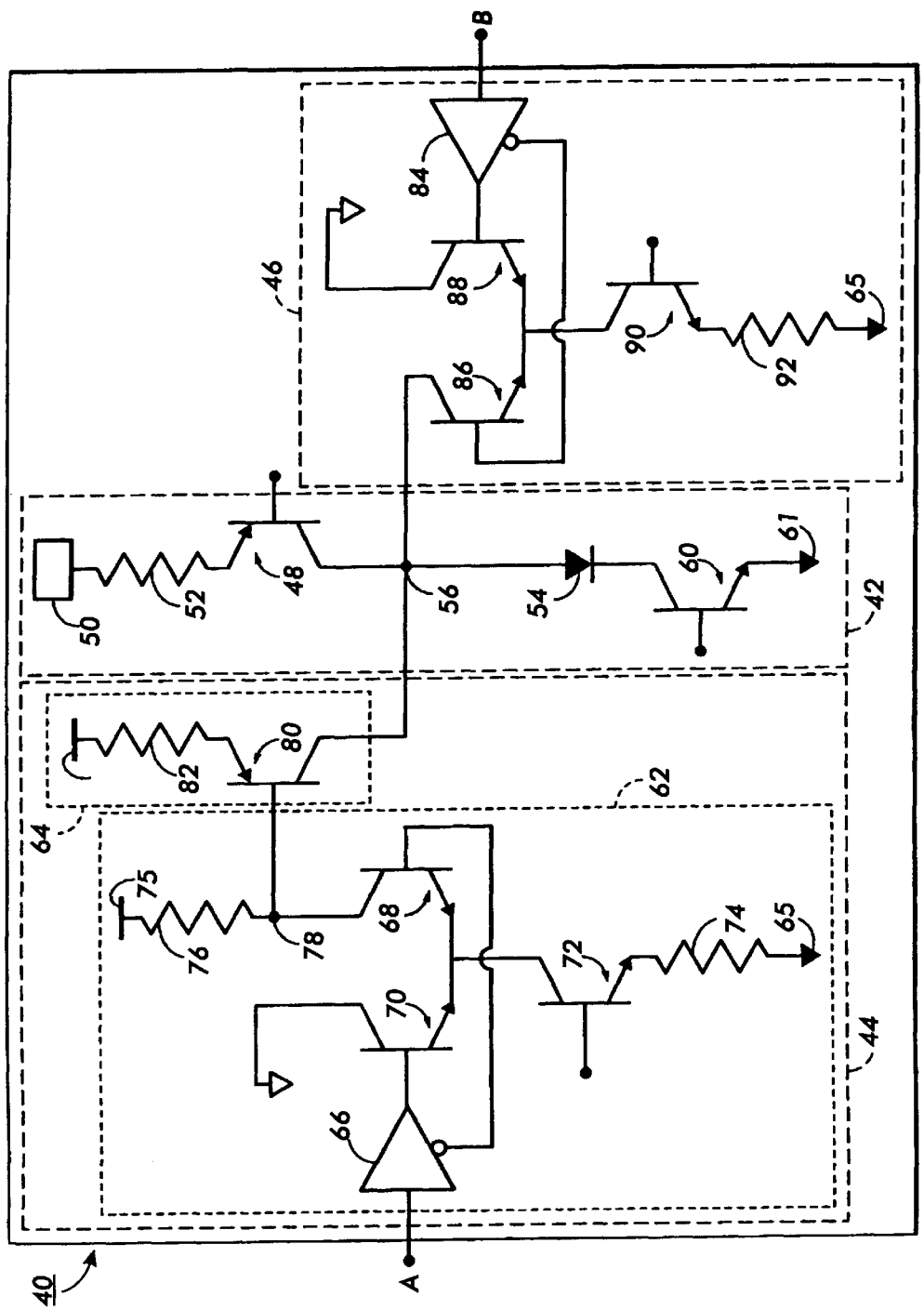
FIG. 3 is a circuit diagram of an amplitude modulator of the present invention.

Referring to FIG. 3, there is shown a circuit diagram 40 of this invention. Circuit 40 comprises a white level circuit 42, a power driver 44 for color pulses and a power driver 46 for black pulses. One feature of this circuit is a combination of sourcing current into and diverting current away from the laser diode verses the conventional way of sourcing as much current as possible into the laser diode. In the white level circuit 42, the emitter of a transistor 48 is connected to an adjustable voltage source 50 through a resistor 52. The base of the transistor 48 is connected to a voltage (not shown) used in the white level uniformity correction as the reference voltage. The collector of the transistor 48 is connected to the anode of a visible laser diode 54 through a junction 56 which is also the output of the circuit 40. The cathode of the diode 54 is connected to the collector of a transistor 60 and the emitter of the transistor 60 is connected to a negative voltage reference 61 while the base of the transistor 60 is connected to a bias network (not shown). A bias network can be a network which provides a current to help push the current into the laser diode faster. Also, the bias network can be used as an active termination network to match the impedance of the power drivers 44 and 46.

The power driver 44 comprises a switching circuit 62 and a current source 64. The current source 64 provides current to the white level circuit 42 in order to generate color pulses. Input A of the power driver 44 is connected to a video output which provides the pixel information for color pulses. In the switching circuit, the input of an inverter 66 is connected to the input A and the inverting output of the inverter 66 is connected to the base of a transistor 68. The non inverting input of the inverter 66 is connected to the base of a transistor 70. The emitters of transistors 68 and 70 are both connected to the collector of a transistor 72. As a current source preference, the emitter of transistor 72 is connected to the negative voltage source 65 through resistor 74 while the base of the transistor 72 is connected to the bias network (not shown). The collector of transistor 68 is connected to a voltage source 75 through a resistor 76 and the collector of the transistor 70 is grounded. The junction 78 between resistor 76 and the transistor 68 is also connected to the base of a transistor 80 of the current source 64. The collector of the transistor 80 is connected to junction 56 and the emitter of the transistor 80 is connected to the voltage source 75 through a resistor 82.

The power driver 46 comprises a switching circuit. This switching circuit sinks the current from the white level circuit 42 to generate the black level pulses. Input B of the power driver 46 is connected to a video output which provides the pixel information for black pulses. The input of an inverter 84 is connected to the input B and the inverting output of the inverter 84 is connected to the base of a transistor 86. The non inverting input of the inverter 84 is connected to the base of a transistor 88. The emitters of transistors 86 and 88 are both connected to the collector of a transistor 90. The emitter of transistor 90 is connected to the negative voltage source 65 through a resistor 92 while the base of the transistor 90 is connected to the bias network (not shown). The collector of transistor 86 is connected to junction 56 and the collector of the transistor 88 is grounded.

In operation, when the circuit 40 of this invention is turned on, the output of the circuit 40 (junction 56) is at the white level. The value of resistor 52 is selected to provide the required voltage for the white level at junction 56. Referring to Table 1, there is shown different inputs to the inputs A and B of the power drivers 44 and 46 in order to generate the white, the color and the black levels.

According to Table 1, to generate the white level, inputs A and B both have to be On. Referring to both FIG. 3 and Table 1, when input A is On, transistor 68 which has its base connected to the inverting output of the inverter 66 is Off. When transistor 68 is Off, there is no current through resistor 76 and therefore the base of transistor 80 has the same voltage as the voltage source 75. Thus, transistor 80 is also Off. Consequently, The white level circuit does not receive any current through the power driver 44. When the input B is On, the transistor 86 which has its base connected to the inverted output of the inverter 84 is Off. When transistor 86 is Off, there is no current sinking into power driver 46. Since there is no current coming from the power driver 44 and no current sinking into the power driver 46, the white level circuit stays at the white level voltage.

TABLE 1

| MODE | A | B |
|---|---|---|
| White | On | On |
| Color | Off | On |
| Black | On | Off |

According to Table 1, if a color level is needed, the input A has to be Off and the input B has to be On. When Input B is On, as it was previously described, no current from the white level circuit sinks into the power driver 46. However, when the input A is Off, the transistor 68 is On and therefore some current passes through the resistor 76. This current causes a voltage drop across the resistor 76 which in turn causes enough voltage difference between the base and the emitter of the transistor 80 and therefore turns On the transistor 80. When the transistor 80 is On, it provides some extra current to the white level circuit and increases the voltage of the junction 56 to the voltage required by the color level.

According to Table 1, if black level is needed, the input A has to be On and the input B has to be Off. As it was previously mentioned, when input A is On, the power driver 44 does not supply any current to the white level circuit. On the other hand, when the input B is Off, the transistor 86 which has its base connected to the inverting output of the inventor 84 is On. When the transistor 86 is On, the current from the white level circuit sinks through the transistor 86, transistor 90 and the resistor 92 resulting in a voltage decrease of the junction 56 to a voltage level required by the black level. The resistor 92 is the limiting resistor which limits the current flow from the junction 56 to provide a voltage required by the black level.

In this invention, the voltage source 65 or the bias of the transistor 72 of the power driver 44 can be selected to provide enough current through the current source 64 in order to generate an output voltage at junction 56 which is high enough to place the light beam into its saturation region. When the light beam has a maximum intensity, there will be no intensity variation since the intensity can not be increased more than its maximum. Therefore, in this invention, the non-uniformity of the color level is eliminated.

Also, the non-uniformity of the white level can be corrected without affecting the color level. A sensor (not shown) can measure the variation of the intensity of the light beam for the white level against the reference voltage connected to the base of the transistor 48. Since the voltage source 50 is adjustable, a feed back loop (not shown) can be connected between the sensor and the adjustable voltage source 50 to adjust the voltage source 50 automatically. By adjusting the voltage source 50 the amount of current from the current source changes resulting in an output voltage which is responsive to the variation of the intensity of the light beam. Therefore, in this invention, the non-uniformity of the white level can be reduced independent of the color level.

Having two power drivers solves the problem of the over shoot, the slow rise time from the the black level to the color level and the slow fall time from the color level to the black level. Referring back to FIG. 2, since there are two power drivers in this invention, each generates half of the fall time $t_{f1}$ and the rise time $t_{r1}$ which requires only half the energy used by conventional modulators. For example, while the first power driver is generating portion n of the rise time $t_{r1}$, the second power driver is generating the portion m of the rise time $t_{r1}$. This substantially improves the rise time $t_{r1}$ and the fall time $t_{f1}$ compared to the rise time $t_r$ (FIG. 1) and the fall time $t_f$ (FIG. 1). Faster rise time and fall time allows the frequency of the modulation to be increased.

In addition, in this invention, by raising the level of the color into saturation region, the intensity variation of the color level is eliminated. When the light beam is generated with its maximum intensity, there will be no intensity variation since the intensity can not be increased more than its maximum. Therefore, a constant intensity will be generated. This has been made possible due to separate power drivers of this invention.

In the prior art, due to the limitations of the power driver, there is a limitation in increasing the level of the color 16 (FIG. 1) to the saturation level. The limitations of the power drivers are due to the fact that power drivers with higher power capabilities can not switch fast enough to meet the requirements of high frequency needed for high speed highlight color systems. Therefore, in order to have a power driver with fast switching capabilities, a power driver with lower power drive capabilities should be used. Consequently, the intensity variation of the color level can not be corrected by raising the color level to the saturation level.

Furthermore, the non-uniformity of the white level can be corrected without affecting the color level. Again this has been made possible since the reference level which is now at the white level is connected to a reference voltage which is separate from the power driver generating the pulses for the color level.

Finally, the advantage of the amplitude modulation of this invention over the pulse width modulation is the elimination of the beating problem.

Therefore, from the above, it can be seen that the embodiment of this invention enables the use of a facet tracking system to achieve high light color application without driving the pulse width modulation into cost prohibitive implementations.

What is claimed is:

1. An apparatus for modulating a light source, comprising;

a light source;

means for providing a first pixel information;

means for providing a second pixel information;

means for generating a given reference voltage;

a first and a second power driver;

said first power driver being operably connected to said means for generating a given reference voltage and being operably connected and responsive to said means for providing said first pixel information for generating a voltage level above said given reference voltage;

said second power driver being operably connected to said means for generating a given reference voltage and being operably connected and responsive to said means for providing said second pixel information for generating a voltage level below said given reference voltage; and said light source being operably connected and responsive to said means for generating a given level of reference voltage, said first power driver and said second power driver for generating an output in accordance with said first and said second pixel information.

2. The structure as recited in claim 1, wherein said given reference voltage represents no color, said first pixel information represents a first color and said second pixel information represents a second color.

* * * * *